(12) United States Patent
Yodoshi

(10) Patent No.: US 7,297,431 B2
(45) Date of Patent: Nov. 20, 2007

(54) VEHICLE POWER SUPPLY UNIT

(75) Inventor: Nobuo Yodoshi, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 333 days.

(21) Appl. No.: 10/387,844

(22) Filed: Mar. 14, 2003

(65) Prior Publication Data

US 2003/0178234 A1  Sep. 25, 2003

(30) Foreign Application Priority Data

Mar. 20, 2002  (JP) ............................... 2002-078821

(51) Int. Cl.
 *H01M 2/02* (2006.01)
 *H01M 2/16* (2006.01)
(52) U.S. Cl. ........................................ 429/34
(58) Field of Classification Search .................. 429/34, 429/38, 39
 See application file for complete search history.

(56) References Cited

U.S. PATENT DOCUMENTS 4,582,765 A * 4/1986 Kothmann ................... 429/13
6,242,124 B1 * 6/2001 Saito et al. ................... 429/38
2002/0055030 A1 * 5/2002 Okumura et al. ............ 429/34

FOREIGN PATENT DOCUMENTS

| JP | 9-263690 A | 10/1997 |
| JP | A 10-120880 | 5/1998 |
| JP | A 11-307063 | 11/1999 |
| JP | 2000-17179 A | 1/2000 |
| JP | A 2000-319532 | 11/2000 |
| JP | A 2002-25340 | 1/2002 |
| JP | A 2002-53745 | 2/2002 |

* cited by examiner

*Primary Examiner*—Tracy Dove
(74) *Attorney, Agent, or Firm*—Kenyon & Kenyon LLP

(57) ABSTRACT

A vehicle power supply unit is provided, which includes a part made of degradable plastic, which may be a battery case of a secondary battery, and may be a separator of a fuel cell when the degradable plastic is made conductive. A condition in which the degradable plastic is decomposed is different from a condition in which it is actually used in a vehicle.

2 Claims, 1 Drawing Sheet

VEHICLE POWER SUPPLY UNIT

INCORPORATION BY REFERENCE

The disclosure of Japanese Patent Application No. 2002-078821 filed on Mar. 20, 2002, including the specification, drawings and abstract is incorporated herein by reference in its entirety.

BACKGROUND OF THE INVENTION

1. Field of the Invention

The invention relates to a vehicle power supply unit including a plastic part.

2. Description of Related Art

An insulating material mainly made of plastic is conventionally used for forming a part used in a vehicle power supply unit for an electric vehicle or the like. Also, some plastics are made conductive and used as conductive materials. For example, Japanese Laid-Open Patent Publication No.2000-17179 discloses a fuel cell including a separator made of conductive plastic (resin). Also, a secondary battery whose battery case is made of plastic is known.

As is widely known, various environmental measures are taken for disposing of regular vehicle parts. Likewise, when disposing of a plastic part for use in electric vehicles, such as a plastic separator of a fuel cell, some environmental measures need to be taken. However, when disposing of such a plastic part of a vehicle power supply unit, the following problem is concerned. That is, when plastics (waste plastics) are buried in the ground together with other waste materials, they remain undecomposed semi-permanently in the ground. Also, when the plastics are burnt using an incinerator, or the like, the useful life of the incinerator reduces owing to high energy required for burning the plastics, or toxic substances are released into the air, thus damaging the environment.

SUMMARY OF THE INVENTION

It is therefore an object of the invention to provide a vehicle power supply unit which does not cause an environmental problem when and after being disposed of.

A vehicle power supply unit according to a first aspect of the invention includes a part made of degradable plastic. Made of degradable plastic, the part is decomposed into carbon dioxides and water by microorganisms, light, or the like. Therefore, it resolves the problem that a plastic part is not decomposed after being disposed of and thus remains as a waste semi-permanently.

According to a further aspect of the invention, it is preferable that the part made of degradable plastic is a separator of a fuel cell. When the separator of the fuel cell is formed of degradable plastic, it prevents an environmental problem which may otherwise be caused when a conventional separator formed of non-degradable material is disposed of.

According to a further aspect of the invention, it is preferable that the part formed of degradable plastic is a battery case of a secondary battery. When the battery case of the secondary battery is formed of degradable plastic, it achieves the same effects and advantages as those obtained when the separator of the fuel cell is formed of degradable plastic.

According to a further aspect of the invention, it is preferable that the degradable plastic has a conductivity. When the degradable plastic has a conductivity, it may be used for forming a separator of a fuel cell.

According to a further aspect of the invention, it is preferable that a condition in which the degradable plastic is decomposed is different from a condition in which the degradable plastic is used in a vehicle. Thus, the degradable plastic is not decomposed into pieces during usage.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Figure 1:
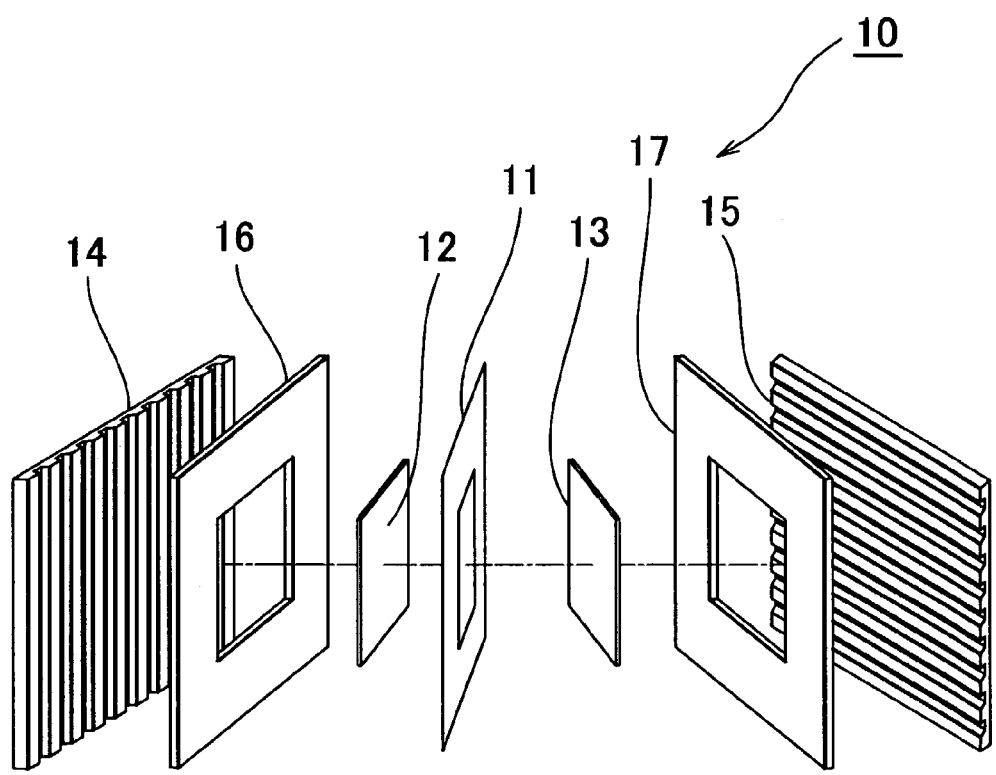
FIG. 1 is an exploded perspective view showing a cell of a fuel cell system as a power supply unit according to one embodiment of the invention.

Hereafter, a vehicle power supply unit according to a preferred embodiment of the invention will be explained with reference to FIG. 1. The vehicle power supply unit includes a part which is formed of degradable plastic. Some examples of the degradable plastic are listed below.

1. Photodegradable Plastic

The photodegradable plastic is one type of plastic which is decomposed by lights (mainly ultraviolet lights). More specifically, the photodegradable plastic is decomposed into a low-molecular-weight compound by lights. In some cases, it is also decomposed into a low-molecule-weight compound by oxygen, water, or the like. Then, the low-molecule-weight compound is completely decomposed into carbon dioxide gas and water by microorganisms, and is thus returned to the nature. That is, the photodegradable plastic includes a certain chemical compound (e.g., a carbonyl group) which is decomposed by lights. Meanwhile, photodegradable plastic is classified into a photosensitive functional group introduction type in which the certain compound is introduced into a polymer, and a photosensitive reagent addition type in which a certain additive is used.

Examples of photodegradable plastic of the photosensitive functional group introduction type are an ethylene-carbon monoxide copolymer and a vinyl ketone copolymer (e.g., methyl vinyl ketone, ethyl vinyl ketone). They are decomposed in approximately 20 to 24 hours when exposed to ultraviolet lights, and in approximately in 2 to 8 weeks when exposed to lights in the natural environment.

In the meantime, aromatic ketone, such as benzophenone, acetophenone, and anthraquinone, may be used as a photosensitizer used for obtaining the photodegradable plastic of photosensitive reagent addition type.

2. Biodegradable Plastic

The biodegradable plastic is a plastic which is decomposed by microorganisms and is thus returned to the ecological cycle. Namely, it is eventually decomposed into carbon dioxide gas and water. The biodegradable plastic can be broadly classified into the following three groups A, B and C.

A) High polymer produced by microorganisms

For example, a hydroxybutyrate-based polyester may be used.

B) Natural high polymer material such as starch, cellulose and chitin

This is a biodegradable plastic that is mainly made of natural high polymer material, such as starch extracted from a crop, such as a corn, a potato, a wheat, and a sugar cane, cellulose extracted from a plant, chitin extracted from a shell of crab, shrimp, or the like.

C) Degradable synthetic plastic;

For example, polycaprolactone may be used.

When the part used in the vehicle power supply unit is formed of such degradable plastic, the part is returned to the nature after being disposed of. Thus, the environmental problems described above, which may otherwise be caused when disposing of the part, can be prevented. In the case of a vehicle power supply unit, the degradable plastic can be used for forming a separator of a fuel cell, a battery case of the secondary battery, and so on.

A fuel cell system 10 is constituted of a plurality of cells stacked therein. As shown in FIG. 1, each cell of the fuel cell system 10 includes a permeable membrane/electrode assembly (MEA) 11, diffusion layers 12, 13 as porous carbon membranes located in both sides of the membrane/electrode assembly 11, and separators 14, 15. Further, seal frames 16, 17 are interposed. Generally, the separators 14, 15 are provided by a plate made of carbon, metal or conductive resin, with passages formed thereon for delivering gas or coolant. When forming a separator with a degradable plastic, it is therefore necessary to make the degradable plastic conductive.

In the following, four examples of a method for obtaining a degradable plastic having a conductivity are described.

1. Mixing a surface-active agent or an antistatic agent into the degradable plastic, or applying the surface-active agent or the antistatic agent to the surface of the degradable plastic.
2. Mixing a conductivity imparting agent (this is also referred to as a conductive filler) into the degradable plastic.

For example, conductive metal powder or conductive metal fiber such as flaky graphite, carbon-based powder, carbon-based fiber, silver, copper and nickel may be used.

3. Forming a metallized film on the degradable plastic molded product.

For example, the film may be made of oxidized tin.

4. Newly designing the degradable plastic.

A conductive high polymer may be synthesized by changing the chemical structure thereof.

When the part in the vehicle power supply units is formed of the polymeric material of the various degradable plastics described above, existing molding devices may be used, such as an extruder, an injection molding device, and a blow molding device which are generally used for molding thermoplastic that is produced in the petrochemical industry. Also, when a separator of a fuel cell is formed of the conductive and degradable plastic, the polymeric material of the respective degradable plastics and the conductivity imparting agent (e.g., flaky graphite, carbon powder, carbon fiber) are mixed by means of a twin-screw extruder or the like, and the resultant mixture is then introduced into the molding device to be formed into a desired shape.

Hereinafter, one example of a method for forming a separator of a fuel cell from conductive and degradable plastic will be described. In this method, the separator is formed using three materials 1, 2, and 3 according to a procedure 4.

1. Degradable plastic

Starch extracted from a corn is used as the biodegradable plastic which is decomposed by microorganisms.

2. Conductivity imparting agent

Flaky graphite (carbon black) is used as the conductivity imparting agent. Here, flaky graphite having a grain size smaller than several micrometers is preferably used. While the amount of the conductivity imparting agent to be added is set to 20 weight percent or lower in this example, it is not necessarily set to 20 percent or lower as long as a desired conductivity can be imparted to the separator. Nevertheless, it is preferable, in terms of the disposability of the separator, that the amount of the conductivity imparting agent is made as small as possible, since it remains even after the plastic has been decomposed.

3. Water

Water is added to when mixing the degradable plastic and the conductivity imparting agent so that the mixture has a liquid form which is suitable for use in conventional molding devices, such as an extruder, injection molding device, and blow molding device, which are generally used for molding thermoplastic.

4. Manufacturing procedure

Starch extracted from a corn, carbon black, and water are mixed by the two-screw extruder at a temperature of 100° C. under a pressure of 30 kgf/cm2. The resultant mixture having a liquid form is then delivered into the molding device (e.g., extruder, injection molding device, blow molding device) to form a separator.

Next, a fuel cell including the separator manufactured as described above was made and a power generation test was performed with the fuel cell. The result of the test indicates that the separator has a desired conductivity and a necessary level of operation stability and mechanical strength under the operating temperature thereof. Subsequently, the fuel cell was disassembled and the separator was taken out. The separator was then placed in a condition that causes decomposition thereof (hereinafter will be referred to as "a decomposing condition" where appropriate), and it was confirmed, as a result, that the separator is decomposed under the decomposing condition. Meanwhile, this decomposing condition may be created by using, for example, activated sludge, soil, or certain enzymes (e.g., amylase and lipase secreted from cell bodies can be effectively used as enzymes for decomposing starch) and microorganisms. Among these options, when enzymes and microorganisms are used, the decomposition of the separator is completed within a relatively short time (several days to several weeks). Although carbon black remains even after the separator has been completely decomposed, it may be reused.

In the case where such a degradable plastic part is used in a vehicle power supply unit, not to mention, it is necessary to arrange the: power supply unit in a vehicle so that the part is not placed in the above-described decomposing condition. Namely, the condition in which the degradable plastic part is decomposed is required to be different from the condition in which it is actually used in the vehicle. In the case of a part formed of photodegradable plastic, for example, it is necessary to dispose the power supply unit within a casing, or the like, so that the part is not exposed to lights. Also, in the case of a part made of biodegradable plastic, it is necessary to dispose the power supply unit within a casing, or the like, so that the part is isolated from microorganisms. Thus, since a fuel cell stack is normally disposed in a casing, the above requirement is fulfilled.

According to the vehicle power supply unit of the above-illustrated embodiment, a degradable plastic is used, which is decomposed into carbon dioxide and water by lights, microorganisms, and so on. Therefore, it solves the problem that plastic is not decomposed semi-permanently after being disposed of.

Also, according to the vehicle power supply unit of the above-illustrated embodiment, a separator of a fuel cell is formed of such a degradable plastic, which prevents the environmental problem which may be caused after a separator made of non-degradable plastic is disposed of. Moreover, while the degradable plastic is used for forming the separator of the fuel cell in the above-illustrated embodiment, it may also be used for forming a battery case of a secondary battery. In this case, too, the same effects and advantages can be obtained.

Also, according to the vehicle power supply unit of the above-illustrated embodiment, since the degradable plastic is made conductive, it can be used for forming a separator of a fuel cell, or the like, which is required to be conductive.

Also, according to the vehicle power supply unit of the above-illustrated embodiment, the condition in which the degradable plastic is decomposed differs from the condition in which it is actually used in the vehicle. Therefore, there is no possibility that the degradable plastic is decomposed into pieces during usage.

What is claimed is:

1. A vehicle power supply unit including a plastic part, wherein the plastic part is a separator and the vehicle power supply unit is a fuel cell;

the part comprises a degradable plastic which is decomposable by light or by microorganism and an electrical conductivity imparting agent, wherein the electrical conductivity imparting agent comprises 20 percent or less of a weight of the part.

2. The vehicle power supply unit according to claim 1, wherein the vehicle power supply unit is covered by or contained in a power supply unit case.

* * * * *